March 17, 1942.  G. S. MOORE  2,276,787
ELECTRIC MILEAGE AND SPEED INDICATOR
Filed Feb. 14, 1938  3 Sheets-Sheet 1

Inventor
Giles S. Moore
By
Ayites Dowell
Attorney

March 17, 1942.   G. S. MOORE   2,276,787
ELECTRIC MILEAGE AND SPEED INDICATOR
Filed Feb. 14, 1938   3 Sheets-Sheet 3

Inventor
Giles S. Moore
By
Attorney

Patented Mar. 17, 1942

2,276,787

UNITED STATES PATENT OFFICE 2,276,787

ELECTRIC MILEAGE AND SPEED INDICATOR

Giles S. Moore, Indianapolis, Ind.

Application February 14, 1938, Serial No. 190,492

7 Claims. (Cl. 177—311.5)

This invention relates to a combination electric speedometer-odometer-signal unit for use on self propelled or driven vehicles, such as automobiles, airplanes, trains, watercraft and the like, to give a visual indication, both interiorly and exteriorly of the vehicle, of the speed of travel thereof as well as a permanent record of the total mileage traveled.

The present application constitutes a continuation in part of my copending application Serial Number 142,700 filed May 14, 1937, and subsequently abandoned.

The primary object of the invention is to provide a simplified type of coacting speedometer-odometer-signal unit which is of relatively simple construction, involves a minimum of moving parts, is durable and presents a highly attractive appearance both while in operation and while at rest.

Another object of the invention is to provide a speed-indicating device, including an odometer wherein mechanical driving connections and like parts which constantly require maintenance attention, such as lubrication and repair, are reduced to a minimum.

A further object of the invention is to provide an electric type speedometer-odometer-signal unit, wherein the actuating means for the indicating devices is controlled through a common regulating member, thereby simplifying the construction of the unit and ensuring a more reliable and accurate operation.

The foregoing and other objects and advantages will become apparent in view of the following description taken in conjunction with the drawings, wherein.

Figure 2:
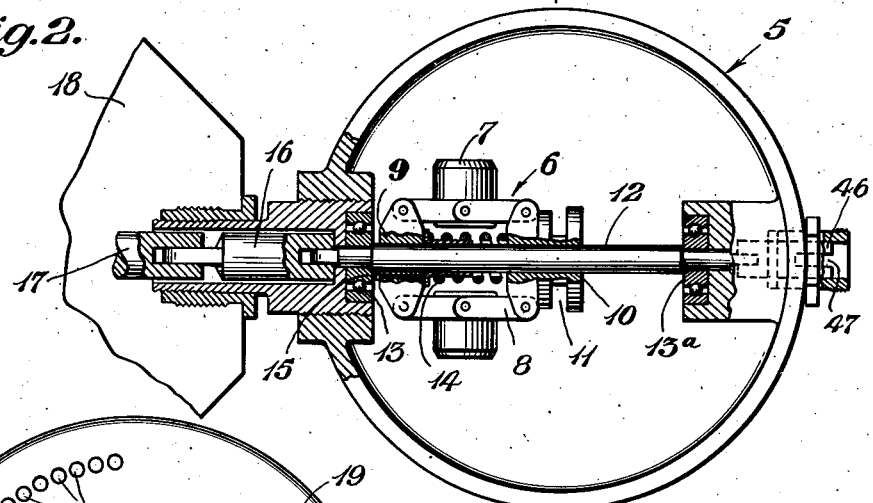
Fig. 2 is a view similar to Fig. 1 with the top or cover plate removed.

Referring in detail to the drawings, in Fig. 2, 5 designates a box or housing for a synchronizing governor generally indicated at 6, and which in its preferred form comprises weights 7 which are connected through the medium of toggle links 8 to a fixed member or anchor 9 and a sliding sleeve 10, the latter being provided with a groove 11 and is mounted to slide on a shaft 12, said shaft being mounted to rotate in bearings 13 and 13a. Between the members 9 and 10 is a governor spring 14, the tension of which may be adjusted through the medium of screw 15.

Shaft 12 has an operative connection through the medium of parts 16 and 17 with a drive shaft or other positively rotating member of the vehicle, the connection being made through the engine block indicated at 18.

Figure 1:
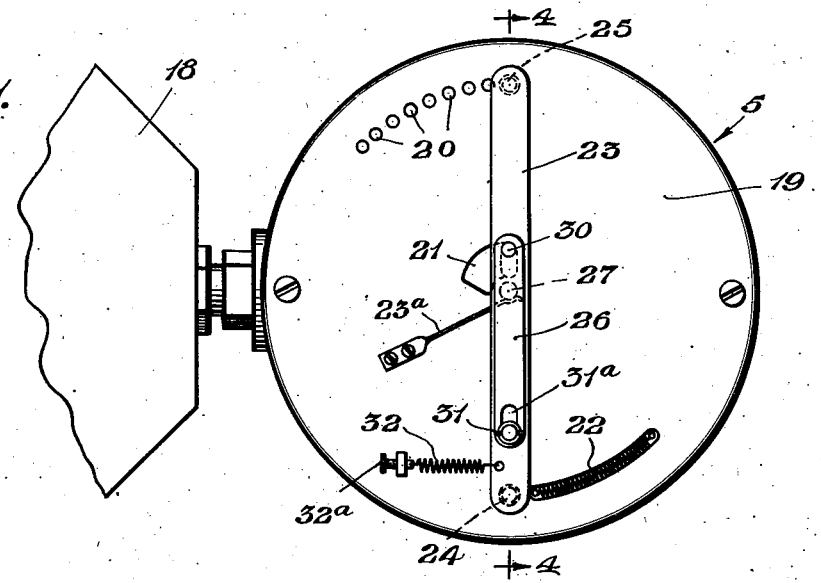
Fig. 1 is a plan view of the governor-switch assembly which serves as the control means for the unit.
Figure 3:
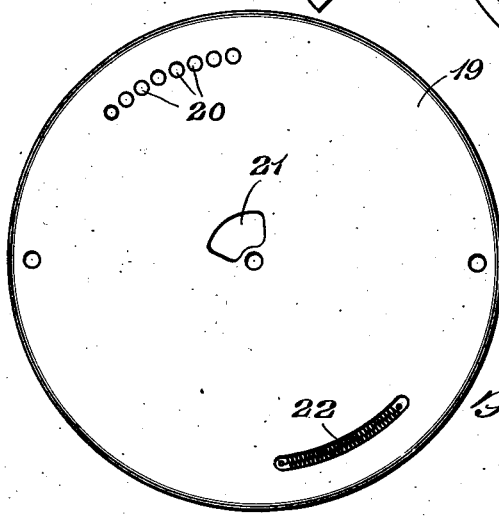
Fig. 3 is a top plan view of the switch coverplate for the governor box or housing with the switch arm removed.
Figure 4:
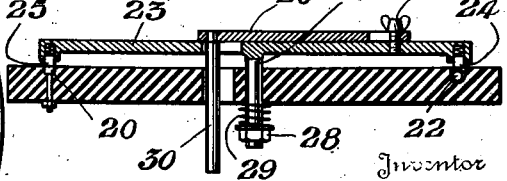
Fig. 4 is a section taken substantially on the line 4—4, Fig. 1.

A combined switch and cover plate is shown more or less in detail in Figs. 1, 3 and 4 and generally indicated at 19. This plate is made of insulating material and is detachably secured on the box or housing 5 and provided with a plurality of switch contacts 20, an arcuate slot 21 and a resistance unit or motor control rheostat 22. Mounted on the cover plate 19 for rotation with respect thereto is a switch member in the form of an arm 23 which at opposite ends carries brushes or wiping contacts 24 and 25, the brush 24 being adapted to wipe rheostat 22 and brush 25 being adapted to wipe contacts 20, the latter preferably being embedded in the plate 19. Arm 23 is provided with a central pivot pin 27 which projects through plate 19 and at its lower end is provided with a nut 28 and a tension spring 29 whereby the brush carrying member or switch arm 23 may be pivotally and resiliently anchored to the plate 19. A plate or flat bar 26 is mounted over arm 23 and at its one end is provided with a pin 30 which projects downwardly through arcuate slot 21 into the groove 11 of governor sleeve 10. At its opposite end the bar 26 is provided with a screw 31 for connecting the bar to the arm 23. A slot 31a permits a limited range of adjustment for plate 26 and the pin 30 carried thereby.

A spring 32, note particularly Fig. 1, serves to normally urge the arm or hand 23 to return position. The action of the governor 5 may also be regulated by adjusting the tension of this spring, through the medium of screw 32a and which is more readily accessible than screw 15.

The arm 23 is made of conducting material and is electrically connected to a suitable source of potential, such as battery B, through the medium of resilient contact member 23a, note Fig. 1.

Figure 6:
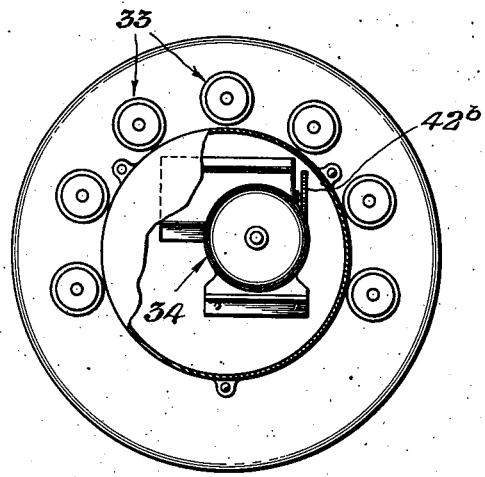
Fig. 6 is a rear view of said dial.
Figure 5:
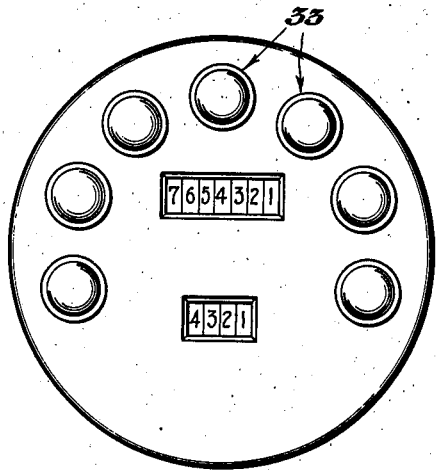
Fig. 5 is a front view of a type of speedometer dial which may be utilized with the improved unit.

The speedometer part of the unit comprises a series of lights, generally indicated at 33, note particularly Figs. 5 and 6, which are arranged to indicate stepped mileages, and these lights may be arranged in arcuate formation, horizontal or vertical alignment, or in any pattern desired, the ease whereby the speedometer lights may be arranged in attractive designs being one of the advantages of the improved speedometer. The contacts 20 are electrically connected with the lights 33 as will be obvious from the wiring diagram in Fig. 10, so that when the brush 25 wipes these contacts, current will be conducted from battery B through hand 23 to the lights and the latter will be illuminated in respective order in accordance with the speed of travel of the vehicle being driven.

Figure 7:
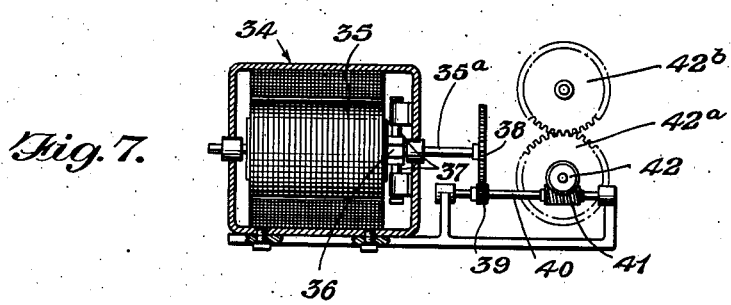
Fig. 7 is a view in enlarged sectional elevation of the motor drive unit for the odometer.
Figure 8:
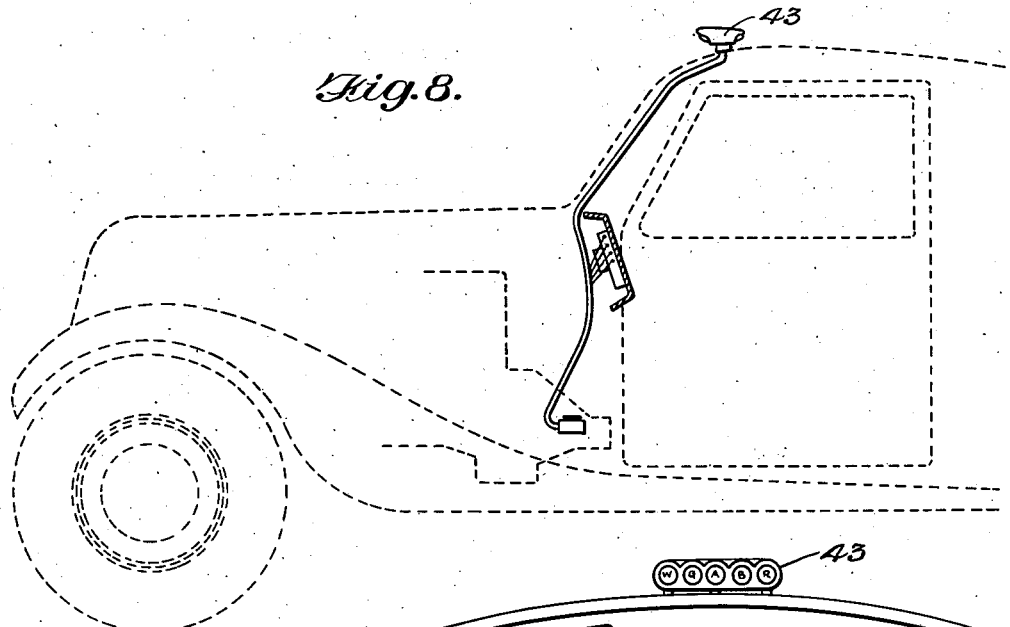
Fig. 8 is a phantom view in side elevation of a motor vehicle showing the improved electric speedometer-odometer-signal unit operatively installed in conjunction therewith.

The odometer is driven through the medium of a motor indicated at 34, note Fig. 7, the motor being of the direct current type, preferably relatively small, and having an armature winding 35 and commutator 36, to which current is conducted through the medium of brushes 37. The motor receives current from the battery B, Fig. 10, through contact 23a, arm 23, brush 24 and resistance unit 22, the leads from the brushes 37 being connected to the one end of the said resistance unit. Thus as the governor rotates at varying speeds, the resistance 22 is gradually cut out or in by arm 23, driving the odometer motor in accordance with the speed of the shaft to which the governor may be applied, or in accordance with the speed of the vehicle.

The armature shaft 35a of the motor 34 is provided with a drive gear 38. Gear 38 is in mesh with pinion 39 secured on a shaft 40, the latter being provided with a worm 41 which in turn meshes with gear 42 driving odometer gears 42a and 42b.

Figure 9:
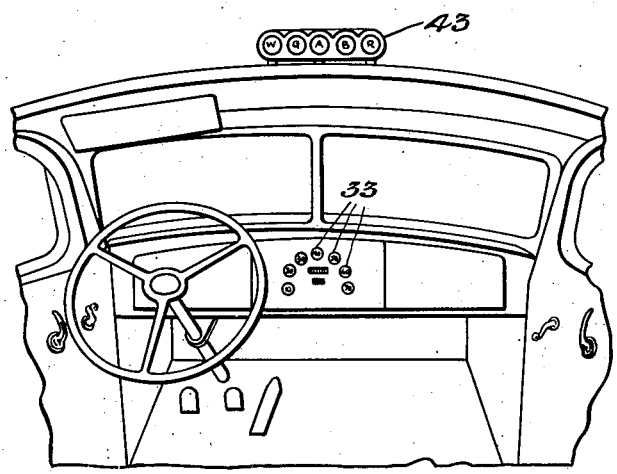
Fig. 9 is a traverse sectional view taken through the driver's compartment of Fig. 8, particularly showing an arrangement of the speedometer lights on the instrument board; and, Fig. 10 is a wiring diagram for the improved unit.
Figure 10:
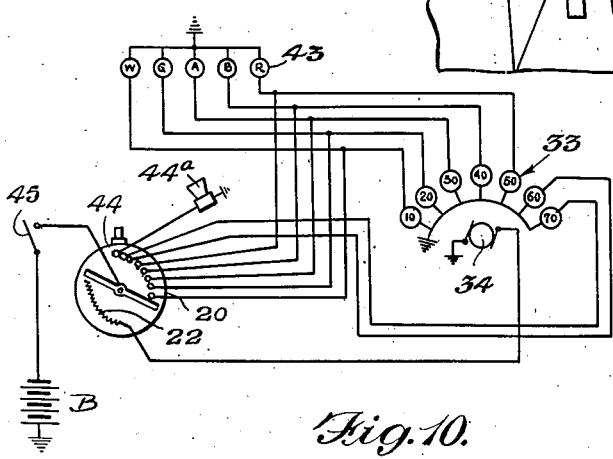

The signal part of the unit may be and preferably is electrically connected to the speedometer lighting circuit, note Fig. 10, the signal including a bank of lights 43, note also Fig. 9, which are arranged to indicate stepped mileages in a manner similar to the speedometer lights 33. These signal lights may be mounted at any suitable point where they will be visible from the exterior of the vehicle and may be of different color combinations as indicated at W, G, A, etc. Thus, simultaneously with the illumination of the speedometer lights 33, the signal lights will also be illuminated, so that a visible indication of the speed of the car will be apparent to an observer. It is preferred that the furthermost advanced signal contact 44 of the group 43 be connected with an audible signal, such as a horn or siren 44a, note Fig. 10, so that when the vehicle reaches a predetermined excessive speed, an audible warning will be given, the warning signal sounding until the car drops back to a certain speed range.

The wiring diagram in Fig. 10 is self explanatory. It will be noted that the battery B serves as a common source of potential for delivering direct current to both the odometer motor 34 and the speedometer and signal lighting system through arm 23. As heretofore stated, there is an electrical connection from each of the contacts 20 to each light of the speedometer group 33, and also to the bank of signal lights 43. Thus as the governor 6 rotates in accordance with the speed of the vehicle sleeve 10 moves back and forth on the shaft 12, thereby oscillating arm 23, the brush 25 at one end of the arm wiping the contacts 20, and the brush 24 at the opposite end wiping the resistance or rheostat 22. In order to obtain an accurate odometer reading, the governor should be adjusted so that immediately upon rotation of the driven shaft to which it is operatively connected, there will be an inward movement of the sleeve 10 sufficient to move the brush 24 into contact with the resistance 22 and start the motor 34. With this in view, the pin 30 is located so that its initial starting point lies at an angle with respect to sleeve 10 such as will interpose a minimum of resistance to governor action. If the speed is stepped up, reaching for example ten miles per hour, the switch arm 23 will be rotated sufficiently to bring brush 25 in contact with the first contact of the bank 20, whereupon the signal light indicating ten miles per hour will be illuminated, both on the speedometer dial and in the exterior signal bank.

If desired, the first contact of the group 20 may consist of a parking light, so that when the switch arm 23 is at rest, and the ignition is on, the parking light will be illuminated. A switch 45, note Fig. 10, serves to cut out the circuit, preferably simultaneous with cutting out of the ignition as is customary in conventional vehicle wiring systems.

Another feature of advantage in the improved switch organization is that means are provided for mechanically connecting the governor shaft 12 with the drive shaft of a speedometer, note Fig. 2. As viewed in this figure, the right hand end of the shaft 12 is provided with a coupling member 46 having a socket 47 therein in which the one end of a speedometer drive shaft, not shown, is adapted to be inserted. Thus, if it is desired to utilize the signal in conjunction with the conventional type of mechanically driven speedometer and odometer, proper connection may be made with the coupling member 46 and the speedometer lighting circuit may be omitted as well as the odometer drive motor; or, a mechanical connection may be made for driving the odometer while at the same time utilizing the speedometer lights for indicating speed of travel; and other desired combined mechanical and electrical combinations made through the medium of this construction.

From the foregoing, it will be seen that a highly simplified, positively operated and attractive type of combined speedometer-odometer-signal unit is provided, and by the use of this unit, the conventional flexible drive shaft and gear connections used in positively driven speedometers and odometers may be avoided, while at the same time obtaining the same results in a more attractive manner. Various designs may be adopted in arranging the speedometer and signal lights, since the parts need not necessarily be grouped in any definite relation.

It will be understood that certain changes in structure and design of the improved unit may be adopted generally within the scope of the invention as defined by the appended claims.

I claim:

1. In combination with a vehicle having means for propelling the same and a source of electrical energy such as a battery and a governor having an operative connection with said propelling means and including a sleeve adapted to be reciprocated in direct relation to the rotation of said governor, a housing for said governor, a cover plate for said housing, a switch member rotatably connected to said cover plate and having an operative connection with said sleeve whereby the switch member is rotated in direct relation to the speed of travel of the vehicle, a series of contacts disposed in said cover plate to be wiped by said switch member and a resistance unit also disposed in said cover plate to be wiped by said switch member, a bank of lights arranged in consecutive order to indicate stepped mileages, an odometer, a direct current rotary electric motor for driving the odometer, and an electrical circuit connecting said battery with said switch member and also connecting said contacts with said lights and said resistance unit with said odometer.

2. In a vehicle having means for propelling the same and a governor having an operative connection with said propelling means together with a source of electrical energy such as a battery, an odometer for indicating the total mileage travelled by the vehicle, a direct current rotary electric motor for driving the odometer, a resistance unit electrically connected in circuit with said motor, a movable switch member having a mechanical connection with said governor, an electric circuit connecting said battery to said motor through said switch member and resistance unit, the switch member engaging said resistance unit to thereby drive said motor in direct relation to the speed of travel of the vehicle.

3. In combination with a vehicle having means for propelling the same and a driven member having an operative connection with said propelling means and movable in direct relation to the speed of travel of the vehicle, a plurality of visual electrical signals arranged in series to indicate in consecutive order the speed of travel of the vehicle, rotatable means for indicating the mileage travelled by the vehicle, a rotary electric motor operating through direct current for actuating said mileage-indicating means, a source of electrical energy such as a battery, a series of contacts electrically conected to said speed signals, a resistance unit electrically connected in circuit with said motor, and a movable switch member adapted to engage said resistance unit and having a mechanical connection with said driven means and an electrical circuit connection with said battery and also with said motor through the resistance unit and whereby said switch member is caused to engage said contacts to energize said speed signals in consecutive order and simultaneously control the flow of current to said mileage-indicating actuating means.

4. In combination with a vehicle having means for propelling the same and a driven member having an operative connection with said propelling means and movable in direct relation to the speed of travel of the vehicle, a plurality of visual electrical signals arranged in series to indicate in consecutive order the speed of travel of the vehicle, rotatable means for indicating the mileage travelled by the vehicle, a direct current electric motor mechanically connected to said mileage indicating means, a source of electric energy such as a battery, a series of contacts electrically connected to said speed signals, a resistance unit located adjacent said contacts and electrically connected in circuit with said motor, and a single movable switch member having a mechanical connection with said driven member and an electrical connection with said battery and also with said motor through said resistance unit and whereby said visual signals and said motor are operated simultaneously directly from a single source of electric energy.

5. In combination with a vehicle having means for propelling the same, a driven member having an operative connection with said propelling means and movable in direct relation with the speed of travel of the vehicle, a plurality of lights arranged in series to indicate in consecutive order the speed of travel of the vehicle, an odometer for indicating the total mileage traveled by the vehicle, a rotary electric motor for driving the odometer, a source of electrical energy such as a battery, a series of contacts electrically connected to said lights, a resistance unit electrically connected in circuit with said motor, and a movable switch member having an operative moving connection with said driven member and an electrical connection with said battery, said switch member engaging said contacts to illuminate said lights in consecutive order and simultaneously wipe said resistance means and cause said motor to be driven in relation to the speed of travel of the vehicle.

6. In combination with a vehicle having means for propelling the same and a source of electrical energy such as a battery and a governor having an operative connection with said propelling means, a movable switch member having an operative moving connection with said governor and a circuit connection with the battery, a resistance unit mounted for contact by the switch member, an odometer, a rotary electric motor for driving the odometer, and an electrical circuit connecting said motor with said battery through said resistance unit and switch member.

7. In combination with a vehicle having means for propelling the same and a source of electrical energy such as a battery and a governor having an operative connection with said propelling means, a housing for said governor, a cover plate mounted on said housing, a switch member rotatably connected to said cover plate and having an operative connection with said governor so as to be rotated thereby in direct relation to the speed of travel of the vehicle, a resistance unit mounted in said cover plate to be wiped by said member, an odometer, a direct current rotary electric motor for driving the odometer, and an electrical circuit connecting said battery with said motor through said switch member and resistance unit.

GILES S. MOORE.